(12) United States Patent
Jalili (10) Patent No.: US 9,159,075 B2
(45) Date of Patent: Oct. 13, 2015

(54) SYSTEM AND METHOD FOR DISTRIBUTION AND REDISTRIBUTION OF ELECTRONIC CONTENT

(76) Inventor: Reza Jalili, Sandy, UT (US)

(*) Notice: Subject to any disclaimer, the term of this patent is extended or adjusted under 35 U.S.C. 154(b) by 0 days.

(21) Appl. No.: 12/830,386

(22) Filed: Jul. 5, 2010

(65) Prior Publication Data

US 2010/0274864 A1 Oct. 28, 2010

Related U.S. Application Data

(63) Continuation-in-part of application No. 12/764,906, filed on Apr. 21, 2010.

(60) Provisional application No. 61/257,837, filed on Nov. 3, 2009, provisional application No. 61/172,222, filed on Apr. 24, 2009.

(51) Int. Cl.
| | | |
|---|---|---|
| *G06F 15/16* | (2006.01) | |
| *G06Q 30/02* | (2012.01) | |
| *G06F 17/30* | (2006.01) | |
| *H04L 29/08* | (2006.01) | |

(52) U.S. Cl.
CPC .......... *G06Q 30/02* (2013.01); *G06F 17/30887* (2013.01); *H04L 67/02* (2013.01); *H04L 67/20* (2013.01)

(58) Field of Classification Search
USPC ......................................................... 709/217
See application file for complete search history.

(56) References Cited

U.S. PATENT DOCUMENTS

| | | |
|---|---|---|
| 6,314,451 B1 | 11/2001 | Landsman et al. |
| 6,317,777 B1 | 11/2001 | Skarbo et al. |
| 6,338,044 B1 | 1/2002 | Cook et al. |
| 6,385,591 B1 | 5/2002 | Mankoff |
| 6,486,891 B1 | 11/2002 | Rice |
| 6,868,426 B1 | 3/2005 | Mankoff |
| 6,928,615 B1 | 8/2005 | Haitsuka et al. |
| 7,013,290 B2 | 3/2006 | Ananian et al. |
| 7,019,856 B2 | 3/2006 | Kawabata |
| 7,406,508 B1 | 7/2008 | Herrmann et al. |
| 7,685,234 B2 | 3/2010 | Gottfried |
| 7,822,734 B2 | 10/2010 | Kumar |
| 7,822,735 B2 | 10/2010 | Suda et al. |
| 2001/0007097 A1 | 7/2001 | Kim |
| 2001/0039546 A1 | 11/2001 | Moore et al. |
| 2002/0026359 A1 | 2/2002 | Long et al. |
| 2002/0120627 A1 | 8/2002 | Mankoff |
| 2002/0133438 A1 | 9/2002 | Tarr |
| 2002/0165767 A1 | 11/2002 | Ogura et al. |
| 2002/0198778 A1 | 12/2002 | Landsman et al. |
| 2003/0004804 A1 | 1/2003 | Landsman et al. |
| 2003/0023488 A1 | 1/2003 | Landsman et al. |
| 2003/0229893 A1 | 12/2003 | Sgaraglino |
| 2007/0043617 A1 | 2/2007 | Stein et al. |

(Continued)

OTHER PUBLICATIONS

Definition of "Server", Collins English Dictionary—Complete and Unabridged HarperCollins Publishers 1991, 1994, 1998, 2000, 2003.

*Primary Examiner* — Alicia Baturay (57) ABSTRACT

A system and method for enabling the recordation of electronic content that has been published via a network, such as the Internet, so that the electronic content may be stored, retrieved, shared, and manipulated by individual users. Furthermore, the system and method of the present invention enable the content publisher of the electronic content to analyze activity associated with its storage and sharing.

13 Claims, 5 Drawing Sheets

(56) References Cited

U.S. PATENT DOCUMENTS

| | | | |
|---|---|---|---|
| 2007/0162461 A1 | 7/2007 | Mankoff | |
| 2007/0168543 A1 | 7/2007 | Krikorian et al. | |
| 2007/0198344 A1 | 8/2007 | Collison et al. | |
| 2008/0046314 A1 | 2/2008 | Chung et al. | |
| 2008/0052369 A1 | 2/2008 | Weber et al. | |
| 2008/0208867 A1* | 8/2008 | Poston et al. | 707/9 |
| 2008/0215437 A1 | 9/2008 | Levy et al. | |
| 2009/0006214 A1 | 1/2009 | Lerman et al. | |
| 2009/0083421 A1* | 3/2009 | Glommen et al. | 709/224 |
| 2009/0125391 A1 | 5/2009 | Toutonghi | |
| 2009/0157507 A1* | 6/2009 | Agius et al. | 705/14 |
| 2009/0183199 A1* | 7/2009 | Stafford et al. | 725/34 |
| 2009/0254931 A1* | 10/2009 | Pizzurro et al. | 725/5 |
| 2009/0259517 A1* | 10/2009 | Wise | 705/10 |
| 2009/0262668 A1* | 10/2009 | Hemar et al. | 370/260 |
| 2009/0319366 A1 | 12/2009 | Choi et al. | |
| 2010/0076841 A1 | 3/2010 | Rajpure et al. | |
| 2010/0088170 A1 | 4/2010 | Glore | |
| 2010/0241507 A1 | 9/2010 | Quinn et al. | |

* cited by examiner

SYSTEM AND METHOD FOR DISTRIBUTION AND REDISTRIBUTION OF ELECTRONIC CONTENT

CLAIM OF PRIORITY

This application is a continuation-in-part of application Ser. No. 12/764,906, filed Apr. 24, 2010, which claims priority from provisional application No. 61/257,837, filed Nov. 3, 2009, and from provisional application No. 61/172,222, filed Apr. 24, 2009. Each above-identified application is incorporated by reference herein, in its entirety, for all purposes.

TECHNICAL FIELD

The present invention generally pertains to processing and distribution of electronic content via an electronic network.

BACKGROUND

The Internet is employed to distribute a wide range of electronic content. One of the most common ways is to publish is on a Web site. An electronic content publisher may be an organization, an institution, or an individual. For example, news organizations, such as the New York Times and the Washington Post, publish news stories, individuals post articles on various subjects in Web journals (i.e., "blogs"), and musicians post songs to be listened to or downloaded. Commercial entities (individual or organizational) may use the Internet to publish listings for their goods or services. For example, online retailers may employ their own Web sites to sell their products or may use an intermediary service to do so (e.g., Amazon.com). Likewise, individuals may sell their products via personal Web pages or may use intermediary services, such as online auctions sites (e.g., eBay.com) or online classified ad services (e.g., Craig's List). Additionally, a content publisher may distribute electronic advertising content. Electronic advertising content is distinct from other forms of electronic content distributed via the Internet. Electronic advertising content is created by a commercial entity in order to drive usage and/or or sales of a particular good or service. It is not merely content associated with a good or service, but rather is distributed specifically to entice an individual to use or purchase the good or service.

Publishing electronic content on the Internet involves making it available via a Web page in the hope that an individual will access the Web page and view it. Unlike traditional forms of media, it may be difficult for a content publisher to determine levels of readership accurately. For example, a newspaper publisher may be able to estimate how many individuals read its periodical based upon newsstand sales and subscription levels. However, the same newspaper publisher may have a difficult time determining how many individuals have accessed its Web site content. Tracking services such as Google Analytics and Site Meter offer utilities for this purpose, but they are not without their flaws. For example, such services often determine readership by placing a cookie on a user's computer via his Web browser. However, if the user's browser privacy settings prohibit cookie-usage, the tracking service is ineffective. If the user deletes the cookie, the tracking service may have to generate another one when the individual next visits the site, thereby counting the same individual multiple times. Furthermore, even if such tracking services manage to track a reader accurately, they provide little data about the individual reader, such as his characteristics, how he discovered the electronic content, and whether he shared the content with another person.

Furthermore, current methods for sharing electronic content are not typically traceable by the content publisher and, as such, these methods provide little benefit to the content publisher. For example, services such as Digg and Delicious allow users to save the Uniform Resource Locator (URL) (also called a "link") associated with electronic content and share the URL with other users. While this is useful for the users, it does not provide the content publisher with any particular benefit other than providing another avenue of distribution. As nearly any URL may be shared via these services, this does not provide one content publisher with an advantage over the other. Apart from a content publisher using such as service as a user itself and searching the service for its own content, the content publisher cannot determine which of its content has been shared, who has shared it, and how many times it has been shared. Other services, such as Google Notebook and Evernote allow users to "cut-and-paste" electronic content to an electronic notebook (i.e., rather than storing a link) and share this content. When this is done, the stored content is no longer linked to the originating source and therefore the content publisher completely lacks a method for determining which of its content has been shared via such services.

For at least the aforementioned reasons, current electronic content storage and sharing methods offer inadequate benefits to content publishers.

Like other forms of electronic content, distributing electronic advertising content, herein referred to as an "electronic ad," involves publishing the content on a particular section of a Web page in the hope that a consumer will see it when viewing the Web page. Typically, the Web page's primary purpose is to distribute another form of electronic content. For example, an electronic ad may be placed on a Web page whose primary purpose is to provide users with online games. Advertising on the Internet involves an enormous market that has been growing steadily since 1995. Massive sums of money have been spent on advertising on the Internet, including tracking the performance of electronic ads and targeting advertisements to particular audiences using technologies. Yet of all electronic ads distributed on Web sites, only about 1% are clicked. Electronic advertising content publishers, such as ad providers and advertisers, have perpetually grappled with the problem of low response rates.

An electronic ad may be created so that its distribution may be tracked and evaluated. For example, an electronic ad may include computer code that enables an advertiser to ascertain how many times it has been viewed (e.g., how many "impressions" or "clicks"). Electronic ad tracking may be conducted for financial purposes. For example, an ad provider may charge for ad distribution on a per viewing basis. An advertiser may be responsible for paying the ad provider each time the ad is viewed or fee for a particular amount of viewings.

Generally, electronic advertising works in the following way: a Web site publisher designates space on its Web site as available for advertising. An ad provider provides the Web site publisher with a computer code to be implanted in this ad space. An ad provider is an entity that distributes electronic ads via a network (e.g., the Internet) on behalf of an advertiser, usually for a fee, such as Google AdSense, Yahoo, and the like. An advertiser is an entity wishing to promote a good, service, or the like. When an individual visits a particular page of the Web site via his Web browser, the page is generated per the Web site publisher's source code, while the electronic ad is generated in the ad space per the ad provider's code. The electronic advertising content is retrieved from the ad provider's ad server and fills the ad space on the Web page. The ad server maintains electronic advertising content, typically configured by the ad provider on behalf of an advertiser. Each time a visitor visits a Web page, a new set of electronic ads may be displayed because the Web site publisher may have business relationships with more than one ad provider or because the same ad provider may choose a different set of electronic ads to show on the Web page. Furthermore, the electronic content code itself may specify various ads to be shown in the ad space and the ad displayed may vary per the user's particular visit to the Web page. A user may select an electronic ad, such as by clicking it, and his Web browser typically is then directed to present a landing page associated with the advertiser. The landing page is typically the advertiser's main Web page. For example, a user selecting an electronic ad for a dating service will be presented with the dating service's home page.

Due to the particularities of electronic advertising content, it may be difficult to store electronic ads for future viewing, sharing, and the like. A user cannot simply bookmark or save a Web page and assume that the next time he accesses the Web page the electronic advertising content will be the same. The Web site publisher may change its ads periodically and electronic ads may be dynamic and, therefore, inherently storage prohibitive. For example, an electronic ad may involve JavaScript code which is executed on the user's Web browser. The JavaScript code accesses the ad server in real-time to retrieve the computer code needed to render an ad on the user's browser. This form of electronic ad cannot be extracted from the Web browser. In fact, the content code is specifically designed to be safe and hidden from other code executed on the same browser and on the same Web page. This level of security makes it difficult to extract the visual and informational content of the ad automatically for storage and later retrieval or sharing. A user may cut-and-paste the electronic ad from the browser into another document, but that action is time consuming and error-prone. For example, the copied ad may contain code that only functions properly when the user's Web browser is at the appropriate Web site. When an ad is cut-and-pasted from the user's Web browser, and the user attempts to view it later, the user's computer may not be able to employ the extracted content code accurately. In some cases, a cut-and-paste operation also will not copy certain ad server access codes or identification codes that may be used by the ad server to keep track of the ad for accounting and billing purposes, thereby interfering with accurate tracking of the electronic ad.

For at least the aforementioned reasons, electronic advertising content does not inherently lend itself for storage and sharing by individual Internet users.

What is needed is a mechanism to improve the distribution and redistribution of both standard electronic content and electronic advertising content. In particular, what is needed is to a system and method for providing individuals with a seamless mechanism for storing electronic content for subsequent viewing and providing a mechanism to accomplish the later viewing, while also providing electronic content publishers with a convenient mechanism to determine the distribution and audience of their electronic content.

SUMMARY

The present invention addresses the aforementioned needs by providing a system and method for enabling the recordation of an electronic content that has been published via a network, such as the Internet, so that the electronic content may be stored, retrieved, shared, and manipulated by individual users. Furthermore, the system and method of the present invention enables the content publisher of the electronic content to analyze activity associated with its storage and sharing.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person with ordinary skill in the relevant art will recognize that other components and configurations may be used without parting from the spirit and scope of the invention.

The present invention is described herein mainly in terms of an individual accessing electronic content via the Internet, such as via a personal computer, a mobile phone, a personal electronic assistant, or a multipurpose mobile device (e.g., an iPhone, a Blackberry, etc.). This is not to be construed as limiting as the present invention may be applicable to any electronic network accessible to a user via a network-appropriate device. For example, the present invention may be applied to broadcast networks (e.g., cable, satellite, etc.), mobile networks, interactive television systems, kiosk systems, and any technologies that enable the distribution and presentation of electronic media.

Electronic Content Storage System (ECSS)

Figure 1:
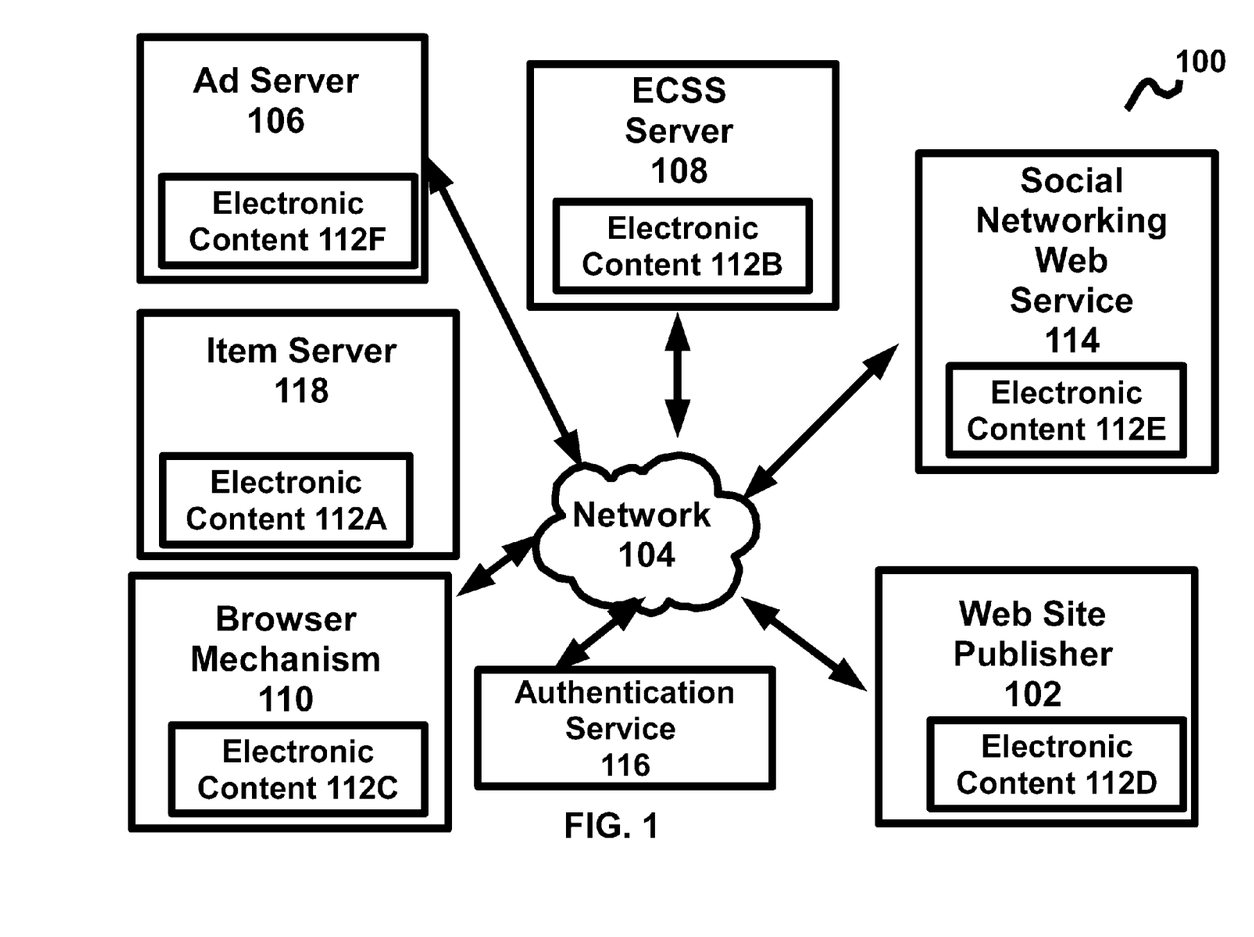
FIG. 1 illustrates a general architecture overview of an embodiment of an electronic content storage system.

As illustrated by FIG. 1, the present invention pertains to an electronic content storage system (ECSS 100). Although only a single instance of each component is depicted, this is for illustrative purposes only and is not to be construed as limiting. ECSS 100 may include one or more item servers 118, ad servers 106, ECSS servers 108, and Web site publishers 102. ECSS 100 may also comprise one or more social networking Web services 114 and/or one or more authentication services 116. A user may interact with ECSS 100 via an accessing mechanism. The accessing mechanism may be browser mechanism 110 and may enable the user to access data from item server 118, ad server 106, or ECSS server 108. For example, a user may access ECSS 100 by loading a Web page on his personal computer via a Web browser, such as Microsoft Internet Explorer or Mozilla Firefox, or through his mobile device via its browsing application. The components of the system may interact with one another via network 104, which may be an applicable electronic network, such as the Internet or a mobile network.

As used herein, a "content publisher" is not to be construed as limiting and may pertain to any organization, institution, or individual that initiates the publishing of electronic content via network 104 (e.g., the Internet). For example, a content publisher may be an ad provider, an advertiser, an online merchant, a blogger, a news organization, a video producer, a music producer, or the like. The term "electronic content" is not to be construed as limiting and may pertain to electronic data in various forms as would be appropriate to the related system component. For example, in relation to item server 118, ad server 106, ECSS server 108, Web site publisher 102, or social networking Web service 114, electronic content (e.g., electronic content 112A, electronic content 112F, electronic content 112B, electronic content 112D, and electronic content 112E, respectively) may pertain to a data record and/or computer code. In relation to browser mechanism 110, electronic content (e.g., electronic content 112C) may pertain to a visual representation of electronic content along with other data, such as a link. Electronic content may include a video, an image, textual data, or the like. Electronic content may include electronic items and electronic ads.

An "electronic item" as used herein may pertain to electronic content published through network 104 for the benefit of the recipient and/or the content publisher, but is not designed primarily to advertise a good or service. For example, an electronic item may be a news article, a product review, a blog entry, a good or service listing, a video clip, a catalog item for sale by a merchant website e.g. by Sears.com, or the like An "electronic item" is not meant to include an electronic ad. An "electronic ad" includes electronic advertising content and is distinct from other forms of electronic content. Electronic advertising content is created by a commercial entity in order to drive usage and/or sales of a good or service, herein collectively referred to as a "product." Its primary purpose is to redirect a viewer's attention from other electronic content towards the product it is advertising. It is not merely content associated with a product, but rather is distributed specifically to entice an individual to purchase or use the product. An electronic item, on the other hand, is distributed for various reasons, but not particularly to drive sales of a product. For example, an independent review of a product is an electronic item and not an electronic ad because its primary purpose is to critique the product. Although a product listing, such as an Amazon listing, provides an individual with a mechanism in which to purchase a product, it is not in and of itself an electronic ad as its primary purpose is to enable a user to purchase the product. Conversely, an electronic ad for a product listed at an online store placed on a Web site (e.g., a blog), is designed to direct the individual to the product listing in the hope that he will purchase the product. Furthermore, unlike electronic item content, electronic advertising content is subject to advertising laws and regulations, such as truth-in-advertising laws.

As used herein, unless explicitly noted, "electronic content" may pertain to either electronic item content or electronic advertising content.

ECSS Link

To participate in ECSS 100, a content publisher may embed an ECSS link in electronic content when creating it. The ECSS link may encode information about the electronic content and the URL of ECSS Server 108. An electronic content publisher may also modify existing content to include an ECSS link. The ECSS link may be configured to be displayed as an ECSS icon in proximity to the actual electronic content. In an alternate embodiment, a content publisher may supply electronic content details to ECSS server 108 and ECSS server 108 may generate the ECSS link for the content publisher to include when the content publisher distributes its content or ECSS server 108 may enable the publishing of the electronic content itself.

An ECSS icon may provide information to the user. In one scenario, the ECSS icon may indicate how many times the electronic content has been stored and/or shared via ECSS 100. This information may be presented within the icon itself or may be presented when the user interacts with the icon. For example, if the user points his mouse pointer at the icon, but does not select it (i.e., he "hovers" the mouse over the icon), he may be presented with associated storage and/or sharing information.

Figure 2:
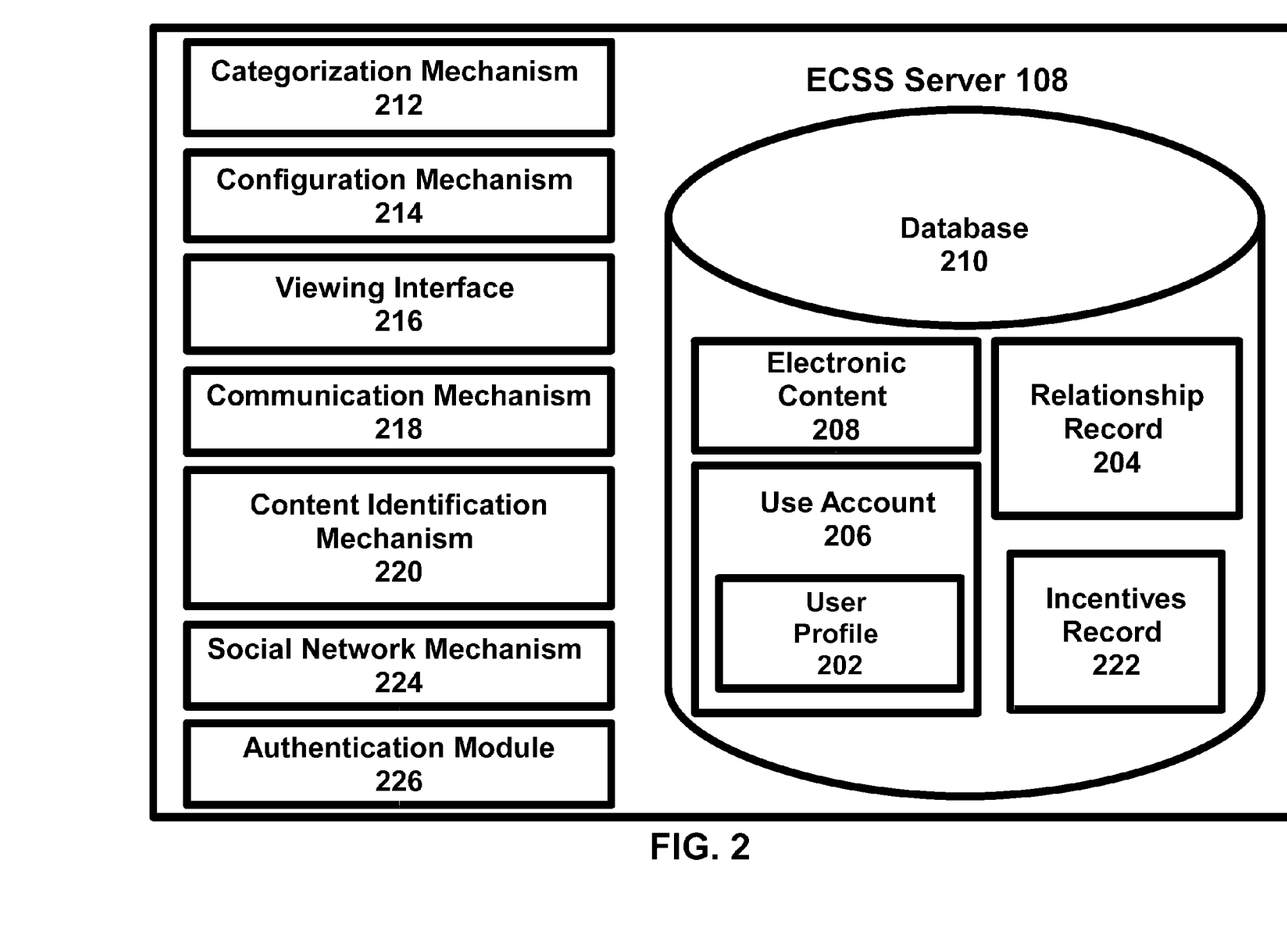
FIG. 2 illustrates an embodiment of an electronic content storage system server.

After the inclusion of an ECSS link in the electronic content, the electronic content is enabled for storage if a user so chooses and may be distributed via standard methods. For example, when accessing an electronic content displayed on a Web page, browser mechanism 110 may display electronic content 112A or electronic content 112F as electronic content 112C by requesting the necessary data from item server 118 and formatting it accordingly. In an alternative implementation, browser mechanism 110 may retrieve the electronic content data via ECSS server 108 (i.e., from electronic content 112B). For example, the electronic content request may be sent directly to ECSS server 108 instead of to item server 118 or ad server 106. ECSS server 108 may retrieve electronic content 112A or electronic content 112F from the appropriate server, configure it via configuration mechanism 214 to include the necessary ECSS link information and, optionally, other user interface elements, and then distribute the ECSS-enabled electronic content 112B to browser mechanism 110, which may display it as electronic content 112C. Because ECSS server 108 may carry out the embedding of ECSS link, this implementation may necessitate no additional effort on the part of the content publisher.

As described below, the ECSS link may assist in the tracking of electronic content stored via ECSS 100.

Stored Electronic Content

ECSS 100 may serve to provide content publishers with a supplemental publication channel. In addition to the content publisher's standard publication channel (i.e., its Web site), users may access stored electronic content via ECSS 100, as will be described in detail below. As illustrated by FIG. 2, ECSS server 108 may include one or more databases 210 that securely maintain electronic content 208 stored by users so that this content may be accessed at a later time. Storing electronic content may involve storing data related to the content in database 210 in such a way that a user may view stored electronic content 208 as it was originally presented. For example, if the electronic content includes a video, the user may store this electronic content and later view the video when accessing the stored content. ECSS server 108 may transmit content usage data to item server 118 or ad server 106 so that it may determine how many times stored electronic content 208 has been viewed. A user's use of the electronic content is described as "viewing," but this is not to be construed as limiting. "Viewing" as used herein may pertain to a user perusing electronic content (e.g., watching a video, reading textual data, viewing images, etc.), and, in the case of electronic advertising content, it may pertain to an ad impression, a user clicking on the electronic ad, or the like.

In one embodiment, stored electronic content 208 may include one or more of tracking information associated with the electronic content, such as the referral location (e.g., information about the Web site at which the user initially viewed the content) and its Uniform Resource Location (URL). In order to avoid possible formatting and display problems, the entire code associated with the electronic content may be retrieved from item server 118 or ad server 106 and included with stored electronic content 208.

In another embodiment, stored electronic content 208 need not include one or more of the aforementioned elements. When ECSS server 108 receives an indication that a user wishes to store electronic content, content identification mechanism 220 may establish a content identifier for the electronic content and this content identifier may be included with stored electronic content 208. For example, content identification mechanism 220 may assign it an alphanumeric identifier. By assigning a content identifier, ECSS server 108 need not store all information associated with the electronic content, some of which may be proprietary to the content publisher. Not storing the entire electronic content information may reduce the burden of ECSS server 108 and may allow item server 118 or ad server 106 to maintain complete control over the its content. In one scenario, stored electronic content 208 only includes the content identifier.

Alternatively, the content publisher may generate content identifier for its electronic content. When publishing an element of electronic content, the content publisher may assign it a content identifier, include it in an embedded ECSS link, and publish the content identifier (i.e., via the ECSS link) in association with the electronic content. The content identifier may be transmitted to ECSS server 108 when the user indicates he wishes to store the associated electronic content (e.g., by clicking the ECSS icon). In alternative embodiment, the content publisher may register a content identifier with ECSS server 108 when it publishes an element of electronic content so that ECSS server 108 may maintain a registry of storable electronic content.

If a content identifier is employed for storage, rather than the complete electronic content code, one or more processes may be employed by ECSS server 108 to present stored electronic content 208 via browser mechanism 110. A content identifier may serve as a reference for data retrieval data within ECSS server 108. Once particular stored electronic content 208 is selected for viewing, ECSS server 108 may locate content retrieval data, such as a computer code, associated with its content identifier. If ECSS server 108 generated the content identifier, it may share the content identifier with item server 118 or ad server 106 so that server 118 or server 106 may associate it with the appropriate data in its own records. This may assist in determining the electronic content at item server 118 or ad server 106 when a user wishes to view stored electronic content 208.

As aforementioned, the use of a content identifier may allow the content publisher to maintain control over its content. As such, it may adjust stored electronic content 208. For example, if a user stores a New York Times article, the content publisher may add materials, such as by updating the article or adding links to other relevant articles, may adjust the ads displayed in conjunction with the article (i.e., the electronic ads displayed with the electronic item), or the like.

As described herein, unless explicitly noted, stored electronic content may pertain to either any of the aforementioned embodiments.

User Data

Database 210 may also maintain a user account 206 for each user. Although electronic content is described herein as being stored in user account 206, this is not to be construed as limiting. In one embodiment, rather than being stored in a particular user account 206, electronic content may be maintained separately at ECSS server 108, but may be associated with a user account 206 via a user identifier or similar mechanism. For example, electronic content may be associated with an individual's email address, user name, identification code, or the like. User account 206 may also may include user profile 202 which may include credential information (e.g., user name and password), personal information, demographic data, financial account data, and the like. Database 210 may also maintain relationship record 204 which may include data pertaining to how particular users and content publishers are related to other users and content publishers. For example, relationship record 204 may indicate which users an individual has listed as friends or which users have stored electronic content from a particular content publisher. ECSS server 108 may also include communication mechanism 218 which may enable ECSS server 108 to interact with other entities attached to network 104, such as item server 118, ad server 106, and browser mechanism 110. ECSS server 108 may, in addition to, or instead of relationship record 204, include social network mechanism 224, such as an application programming interface (API), thereby enabling interaction with a social networking Web service 114, such as Facebook. One or more elements of relationship information and user profile data may be stored in association with the user's social network account in addition to, or instead of, being associated with user account 206 at ECSS server 108.

Electronic Content Storing

As a user interacts with a Web page, he may be presented with ECSS-enabled electronic content. For example, the user may access a blog and view electronic content on a displayed Web page. If the user wishes to save the electronic content for later viewing, he may select the ECSS icon, such as by clicking it with a mouse. The electronic content may then be stored to ECSS server 108. If the electronic content is an electronic ad, when the electronic ad is selected, an electronic form may become visible, overlaid on the electronic content, presenting the user with two options: go to the ad landing page or to store the electronic ad such that there is no further distraction from the current Internet activity of the user. An ECSS link may allow the user may store the electronic content in one or more fashions. For example, by clicking an ECSS icon, the user may indicate that the electronic content should be stored as primary content, whereas if he only "hovers" his mouse pointer over the ECSS icon, this may indicate to ECSS 100 that the electronic content should be stored as secondary content. This may allow a user to recall content he had a passing interest in Web browser to content that fully engaged him. If electronic content is stored as secondary content, the ECSS 100 may not store the full content, but rather store a simpler indication, thereby allowing the user to later revisit his secondary content to determine whether he wishes to save the full content (i.e., save it as primary content) or delete it. In one scenario, secondary content may be removed automatically from user account 206 after a set time period (e.g., after 30 days).

In response to the receipt of ECSS link information (e.g., the URL and encoded content information) at ECSS server 108, authentication module 226 analyzes the user's credentials in order to associate the electronic content with the appropriate user account 206, thereby storing it. As aforementioned, when a user opts to store electronic content, content identification mechanism 220 may associate a content identifier with stored electronic content 208. In one embodiment, ECSS server 108 communicates the content identifier to item server 118 or ad server 106, which may in turn associate the content identifier with the electronic content in its own database. Any known method may be employed to identify the user and his user account 206. For example, a user's credentials may be a tracking cookie or a user name and password. In another embodiment, ECSS 100 may include authentication service 116 and authentication service 116 may authenticate users on behalf of ECSS server 108, rather than ECSS server 108 itself. In one embodiment, a user may store electronic content in association with one or more of his ECSS user account 206 and his social network Web service 114 account by way of social network mechanism 224. Social network Web service 114 may handle user authentication instead of, or in addition to, ECSS server 108 or authentication service 116.

In one scenario, a software application may ease use of ECSS 100. For example, an "add-on" for a Web browser and/or a Web service may enable functionality that eases the storage of electronic content to ECSS server 108, allowing a user to store electronic content displayed to the appropriate user account 206. In regard to electronic advertising content, the electronic ads still may be shown as the user employs browser mechanism 110 or they may be suppressed until the user accesses ECSS server 108 to view them.

Electronic Content Sharing

ECSS 100 may also enable the sharing of stored electronic content. This may allow for the viral transmission of electronic content. A user may be enabled to share stored electronic content 208 with other individuals. This may be done through ECSS server 108 (i.e., from one ECSS user to another) or ECSS server 108 may interact with another service, such as social networking Web service 114 (e.g., Facebook.com, MySpace.com, etc.), so that a user may share stored electronic content 208 with other users of social networking Web service 114. As aforementioned, social network mechanism 224 may enable ECSS server 108, and in turn the user, to view, store, and share electronic contents via social networking Web service 114. In one embodiment, ECSS server 108 itself may serve as a social networking Web service and users may see which stored electronic contents 208 other users have shared. Alternatively, a user may be enabled to share stored electronic content 208 via email, such as by emailing a link to stored electronic content 208. A user may be required to have authorization by another user to be privy to shared electronic content. For example, an individual's shared, stored electronic content 208 may only be visible to other users the individual has indicated are friends. To encourage users to share stored electronic content 208, content publishers or the ECSS service provider may compensate a user for sharing. A user may be required to share a minimum amount before being compensated and/or a user may be limited to sharing a maximum number for a particular period (e.g., 100 items/ads per month). Once a user has shared stored electronic content 208, it may be associated with both the initial user and the recipient.

Viewing and Managing Stored Electronic Content

After electronic content has been stored in association with user account 206, the user may access ECSS server 108 to view it. Electronic content may be considered stored in (i.e., associated with) an individual's user account 206 if the individual stored it, if another ECSS user shared it with the individual, or if the individual's profile settings allow ECSS server 108 to store the electronic content in his user account 206 automatically. Viewing interface 216 may present to the user stored electronic content regardless of who stored the content or may present only electronic content stored by a certain set of users. For example, thumbnail images representative of stored electronic content may be presented. While a user may have a personal set of stored electronic content (e.g., content he has stored or content he has received via sharing), he may also be able to access the stored electronic content of other users. A user may be allowed to designate which of his stored electronic content is public and which is private.

The user may access ECSS server 108 in various manners. For example, a user may access ECSS server 108 by accessing a Web site, using a keyboard combination, or by right clicking on an ECSS icon displayed in conjunction with electronic content, thereby accessing a menu with a link to access ECSS server 108. Once ECSS server 108 is accessed, the user may provide credentials. Alternatively, a user need not identify himself to view electronic content stored publicly. Stored electronic content 208 may be presented in the order in which it was stored, for example, displaying the first stored content at the top or bottom of a list. In one implementation, participating content publishers may affect the presentation order of stored electronic content 208. For example, an ad provider or advertiser may compensate the ECSS service provider in order to have its ad presented advantageously. Additionally, the user may be enabled to sort his stored electronic content 208 as he wishes, such as by date saved, title, and the like.

The user may select stored electronic content 208 to view it. Selecting stored electronic content 208 may load the content per the stored data. The user need not log into or have access to the Web page where the content was originally displayed as pertinent information and/or a content identifier has been recorded at ECSS server 108. Once the user accesses ECSS server 108, ECSS server 108 may serve as his access point to his stored content. The particulars of displaying stored electronic content 208 may vary per implementation. Viewing interface 216 may enable the presentation of the stored electronic content the user has chosen to view in various fashions. For example, viewing interface 216 may enable browser mechanism 110 to present the selected electronic content as included in the ECSS interface or the selected electronic content may appear as within an ECSS framing screen.

Figure 3:
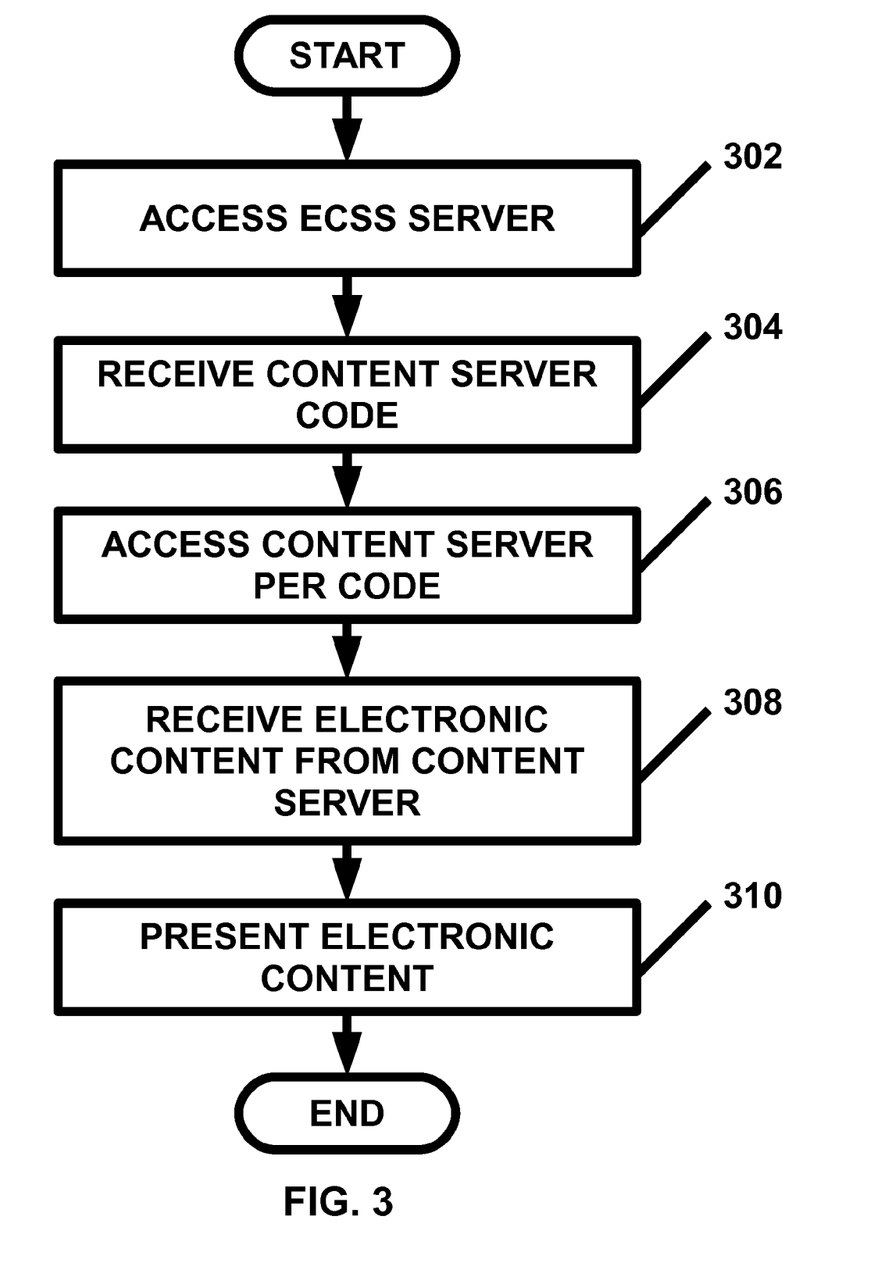
FIG. 3 illustrates a flowchart process for accessing stored electronic content from a content server.

As illustrated by FIG. 3, in one embodiment, the user may employ browser mechanism 110 to access ECSS server 108 to view stored electronic content 208 (step 302). Browser mechanism 110 may receive computer code which may include the original server content code (or code sufficiently similar) (step 304) and may employ it to access the content server (i.e., item server 118 or ad server 106) (step 306). Browser mechanism 110 may then receive the appropriate electronic content from the content server (step 308) and present the electronic content to the user (step 310). In one scenario, ECSS server 108 may provide browser mechanism 110 with the same content code used at the Web page from which the user stored the electronic content 208, thereby functioning in a fashion similar to the originating Web page. For example, the retrieved computer code may indicate the stored electronic content is provided by the Google ad server and the user's Web browser may access the Google ad server to retrieve it. A content identifier previously assigned to stored electronic content 208 by content identification mechanism 220 may be used to assist with this process. The computer code provided to browser mechanism 110 may include the content identifier and browser mechanism 110 may relay this to the content server so that the content server may employ it to locate the appropriate electronic content in its records.

Figure 4:
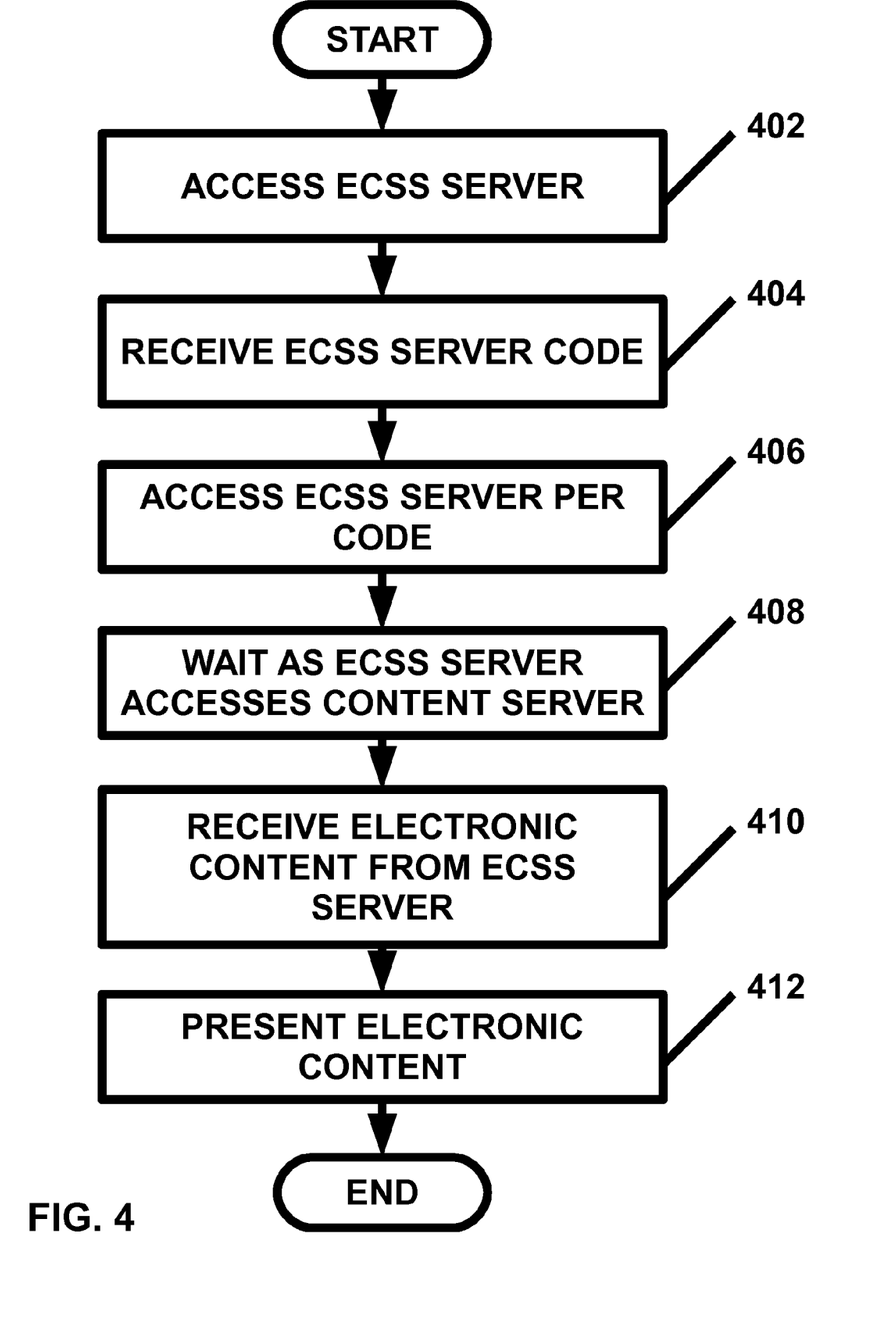
FIG. 4 illustrates a flowchart process for accessing stored electronic content from a content server via an electronic content storage system server.

As illustrated by FIG. 4, in another embodiment, when browser mechanism 110 accesses ECSS server 108 (step 402), it may receive computer code that instructs browser mechanism 110 to access ECSS server 108 itself (step 404). When browser mechanism 110 accesses ECSS server 108 per this code (step 406), it may wait as ECSS server 108 accesses the appropriate content server to retrieve the electronic content (step 408). Once ECSS server 108 has retrieved the necessary content, browser mechanism 110 may receive it (step 410) and present the electronic content to the user (step 412). For example, when browser mechanism 110 accesses stored electronic content 208, the received computer code (e.g., HTML snippet data) may include a link (e.g., a URL) to ECSS server 108, rather than item server 118 or ad server 106, and ECSS server 108 may then employ the computer code to determine the proper server from which to receive the electronic content. A content identifier may assist with this process as well. For example, the computer code sent to browser mechanism 110 from ECSS server 108 may include the content identifier and ECSS server 108 may employ this to determine the correct server. In one embodiment, if the content server has also associated the content identifier with the electronic content in its own records, ECSS server 108 may relay the content identifier to the content server in order to assist in the retrieval of the necessary electronic content. In one scenario, ECSS server 108 only transmits the content identifier to the content server for electronic content retrieval. Because the electronic content passes through ECSS server 108, ECSS server 108 may be enabled to modify stored electronic content 208.

Figure 5:
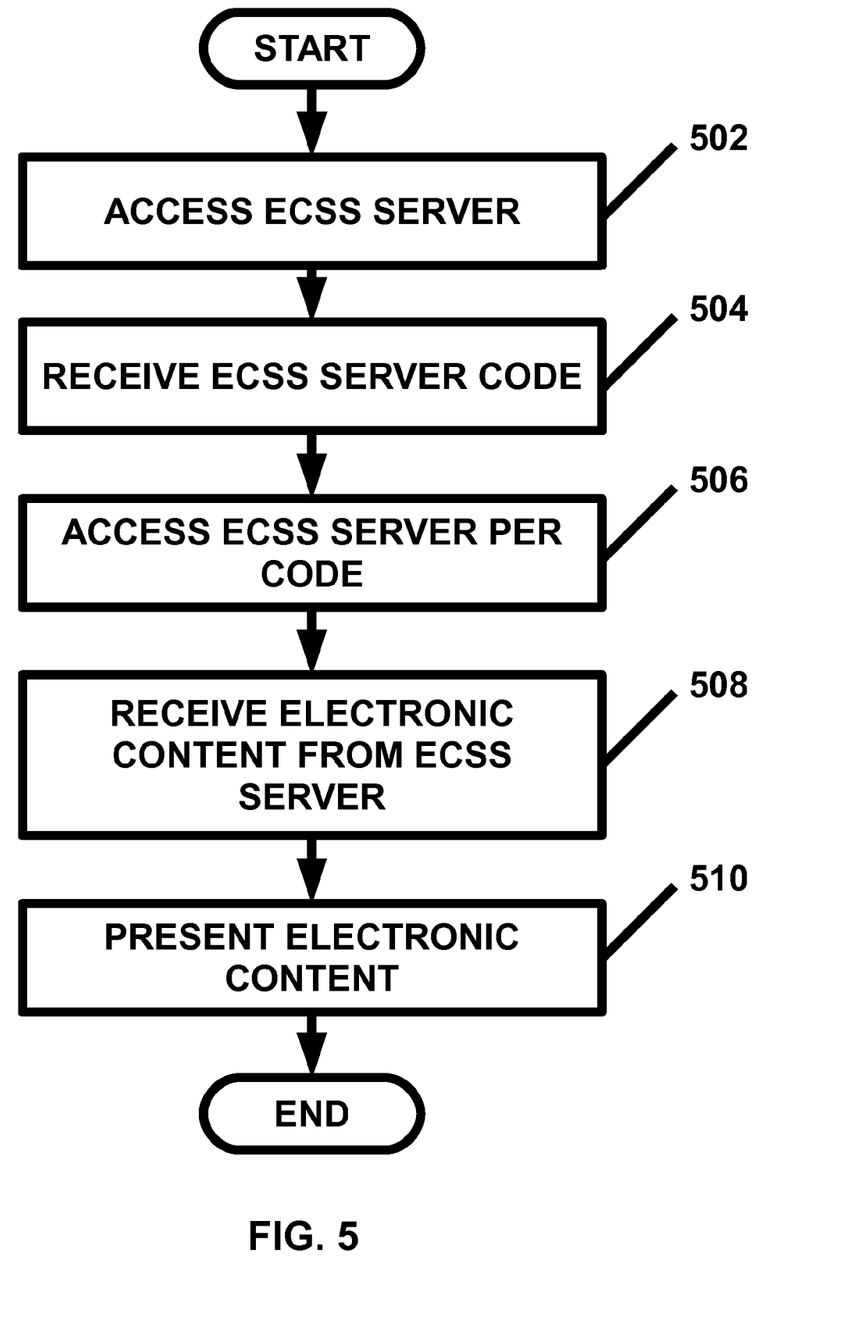
FIG. 5 illustrates a flowchart process for accessing stored electronic content from an electronic content storage system server.

As illustrated by FIG. 5, in another embodiment, if stored electronic content 208 includes all the necessary electronic content, item server 118 or ad server 106 need not be accessed by browser mechanism 110 or ECSS server 108. When browser mechanism 110 accesses ECSS server 108 (step 502), it may receive computer code that instructs browser mechanism 110 to access ECSS server 108 itself (step 504). A content identifier may be used to assist in locating the proper stored electronic content. When browser mechanism 110 accesses ECSS server 108 per this code (step 506), browser mechanism 110 may receive the electronic content (step 508) and present the electronic content to the user (step 510). For example, ECSS server 108 may pregenerate the code (e.g., HTML) so that browser mechanism 110 may display the electronic content based solely on the content it maintains.

In regard to stored electronic advertising content, stored electronic ads may be optimized upon presentation to increase overall advertising effectiveness. As aforementioned, because the request to view stored electronic content 208 involves ECSS server 108, ECSS server 108 may be enabled to modify the stored electronic content 208 when it is displayed. Ads from one advertising entity (e.g., an ad provider or advertiser) or from a set of advertising entities may be optimized such that each ad is more attractive to the user or the set of ads together are more attractive to the user. The advertising entity need not rely on ad server 106 to enhance stored electronic content 208. For example, if the user has stored an ad for a chair and an ad for a table, ECSS server 108 may retrieve and display a bonus ad for a set of dishes, a table cloth, or a discount for buying both the table and the chairs. ECSS server 108 may display such ad combinations even if the ads are from different advertising entities. An advertising entity associated with an electronic ad may pay the ECSS service provider a fee so that an additional electronic ad is presented whenever a particular electronic ad is presented. If a second advertising entity is paying for this service, the second advertising entity may request to have his electronic ad presented more prominently than the ad of the first advertising entity.

ECSS server 108 may enable users to personalize electronic content in various manners. For example, a user may be enabled to rate or rank the electronic content he or other users have stored or he may add comments. Stored electronic content 208 may be associated with one or more categories. For example, an electronic ad for beer may be categorized as "beer," "drink," and/or "alcohol" or an electronic item pertaining to a digital camera may be categorized as "photography," "electronics," and/or "photographs." When a user accesses his user account 206, his stored electronic content 208 may be displayed as grouped by category. Content categorization may be handled by the content publisher, the user, an ECSS service provider, categorization mechanism 212, or a combination thereof. For example, a content publisher may associate data with electronic content that indicates one or more proper ECSS categories. The user may log into his user account 206 and categorize his stored electronic content 208 as he wishes. For example, a user may "tag" the stored beer ad as "funny" or "beer" or the stored digital camera item as "birthday gift idea" or "Christmas present." Categorization mechanism 212 may categorize electronic content based on information provided by content publishers and/or users, or it may analyze electronic content and categorize it appropriately.

Tracking of Electronic Content Storage, Viewing, and Actions

ECSS server 108 may interact with item server 118 or ad server 106 to enable proper tracking of stored electronic content 208. Because the electronic content managed via ECSS 100 may be stored and accessed via ECSS server 108, ECSS server 108 may create a data trail that simple link sharing services cannot equate. ECSS server 108 may log how many times a particular piece of electronic content has been saved, when it was saved, and details about the individual(s) who have saved it (e.g., data stored in his user account 206), how many times it was shared, details about who it was shared with, and the like. This information may be provided to participating content publishers, providing them with valuable insight into their audience and into the performance of their electronic content. The user data made available to content publishers may range from broad, generalized information to specific user characteristics. For example, the ECSS service provider may only provide general user characteristics, such as geographical region, age range (e.g., 30-35), gender, or the like or may provide specific data, such as name, email address, mailing address, age, or the like. The ECSS service provider may also enable full or limited access to a user's relationship record 204 data. In regard to electronic ads, ECSS server 108 may enable tracking of click-through rate and any associated payment (e.g., royalties, etc.). Tracking may be enabled by an accounting mechanism, such as an API, to which any item server 118 or ad server 106 from a participating network may connect.

Electronic ads may operate via various budgeting schemes and, therefore, specific accounting processes may be necessary in order to ensure accurate accounting of an electronic ad stored and/or shared via ECSS 100. The accounting process employed may be associated with the method of electronic content storage and/or display. If the presentation of stored electronic content 208 is handled in a fashion similar to an electronic ad displayed at a Web page (i.e., the electronic advertising content is retrieved from ad server 106), as illustrated by FIG. 3, ad server 106 may treat the viewing of stored electronic content 208 in the same manner as an ad presented on a standard Web page. If all of the data necessary for displaying stored electronic content 208 has been stored at ECSS server 108, as discussed in relation to FIG. 5, browser mechanism 110 may interface solely with ECSS server 108 to display stored electronic content 208, and therefore ECSS server 108 may maintain a viewing log for stored electronic content 208 and relay this viewing data to ad server 106, instantly, periodically, or the like. If the display of stored electronic content 208 requires ECSS server 108 to serve as an intermediary between browser mechanism 110 and ad sever 106, as depicted by FIG. 4, one or more of ECSS server 108 and ad server 106 may track the viewing of stored electronic content 208.

ECSS server 108 may enable the analysis of stored electronic content 208 in order to ascertain ad usage, such as viewings (e.g., "impressions," "clicks," etc.). In particular, ECSS sever 108 may determine which electronic ads have been stored and/or shared but have not yet been viewed by the associated user(s). As such, ECSS server 108 may provide a content publisher with data indicative of pending ad viewings. The content publisher may employ this data to determine how much interest there is in a particular electronic ad and whether his current budget for the electronic ad is sufficient. Unlike current processes, the analysis of unviewed electronic ads provides a content publisher with concrete data reflective of how many individuals are interested in viewing its electronic ads. For example, if an advertiser has allotted for 200 viewings of a particular electronic ad and the ad server 106 indicates that the electronic ad has been viewed 95 times total (via ECSS 100 and perhaps other sources), and the analysis of ECSS server 108 indicates that its database 210 has 150 potential viewings of the electronic ad, the advertiser may ascertain that its budget might be exceeded by at least 45 viewings. The advertiser may then take appropriate action, such as by increasing its budget for that electronic ad. If the advertiser does not wish to increase its budget to match demand, the ad might be removed from ad server 106 before certain users have had an opportunity to view it. In this case, a user may be notified that the particular stored electronic content 208 is no longer available. The user may be informed of this when he attempts to view the particular stored electronic content 208 and/or ECSS server 108 may notify him via personal information held in his user account 206 (e.g., via an email sent to the user's registered email address).

Although a user may utilize ECSS 100 simply for pleasure, he may also be encouraged to participate through various incentive methods, the particulars of which may be stored in one or more incentive records 222. In one scenario, the user may register one or more financial accounts in association with his user account 206 and may receive financial benefits. For example, a content publisher, such as an advertiser, may compensate the user for displaying its electronic content advantageously on his ECSS display. Alternatively, a content publisher may compensate the user when the user accepts a promotion, provides information to the content publisher, provides a recognized benefit to the content publisher, or the like. ECSS 100 may facilitate immediate and scheduled transactions using information stored in user account 206 (e.g., financial information, personal information, and/or other information) and the user may be compensated by receiving a monetary payment into a registered financial account. Alternatively, the user may receive other benefits, such as a discount on a product. A user also may employ a registered financial account for electronic commerce purchases, as detailed below.

Aggregate Information Analysis

ECSS 100 may enable the display and analysis of aggregate information. For example, ECSS server 108 may display to users and/or content publishers aggregate statistics and information regarding electronic content stored for various groups of users or for all users. Aggregate information may also be used to affect how stored electronic content 208 is displayed to users. For example, electronic content may be displayed in order of popularity, such as by the number of users who have stored it or the number of viewings. Additionally, ECSS 100 may enable incentives based on group decisions. In one scenario, users may receive a discount or other special benefit if a certain number of users take a certain action. For example, if a stored electronic ad pertains to a chair and if 10,000 chairs are purchased, each user that has stored the relevant electronic ad may receive a 10% refund. The refund may be credited to a user's registered financial account. In such a scenario, a user may have to indicate to the retailer that he is an ECSS user, such as providing his ECSS user name or an ECSS membership number. The retailer may in turn relay this information to ECSS server 108, which may then associate users that participated in the promotion. This data may be shared with content publishers so that they may analyze it.

ECSS server 108 may enable users to search the electronic content that has been stored by other users. In one embodiment, rather than rely on user activity, content publishers may also store electronic content with ECSS server 108 so that it may be searched. The user may access an ECSS Web page and enter a query into a search field to search for electronic content. Database 210 may then be searched for any relevant stored electronic content, such as by searching metadata, such as comments, categories (e.g., "tags"), descriptions, or the like. In one scenario, ECSS server 108 is enabled to translate a search query into multiple languages, thereby enabling it to search all stored electronic content 208, regardless of the language associated with it. In addition to searching its own internal records, ECSS server 108 may query an external source, such as item server 118 or ad server 106. For example, a user interested in leasing a vehicle may request ads that provide leasing discounts (e.g., the user may search for a "car lease discount"). The user may then be presented with a result set listing any relevant electronic content that has been stored. ECSS server 108 may also relay the query to ad server 106 and/or item server 118 to determine if ad server 106 or item server 118 has any relevant electronic content stored within its records and, if so, ECSS server 108 may retrieve the relevant electronic content and display it to the user.

Due to the benefits of the ability to request electronic content, a user may be required to compensate the ECSS service provider, other users (e.g., those who stored the requested content), or content publishers (e.g., who issued the requested electronic content). A content publisher or the ECSS service provider may compensate a user for sharing electronic content.

Electronic Commerce

ECSS 100 may enable convenient electronic commerce (e-commerce). As aforementioned, electronic content 208 stored at ECSS server 108 may include an electronic item, such as a listing for a product. For example, a user may store an Amazon.com book listing in association with his user account 206. A content publisher, in this case being a commercial entity such as a vendor, may enable one or more of its listings with an ECSS link, thereby allowing ECSS server 108 to develop a registry of its products. Each time a user stores one of the content publisher's products, ECSS server 108 adds one more instance of the product to database 210. This configuration allows the ECSS server 108 to grow a registry of the content publisher's products based upon user action rather than publisher action. As aforementioned, a content publisher may actively store electronic content, such as a product listing, with ECSS server 108. In one embodiment, ECSS server 108 may handle saved product listing electronic content differently from other forms of electronic content. For example, once a product listing has been stored with ECSS server 108, it may actively communicate with the appropriate item server 118 to acquire further data regarding the product (this may not be necessary if the content publisher stored the electronic content itself). Due to the nature of ECSS 100, this configuration may enable the user to search product listings stored by an immense, possibly global, audience.

A user may search ECSS server 108 for product listing electronic content. For example, rather than a global search for Moby Dick, which may produce results including literature reviews, movie ads, and product listings, a user may specify his search for only products related to Moby Dick. The search results may include comments, tags, and the like that have been associated with the electronic content when other users stored it. For example, a product search for Moby Dick may generate a search result from a particular user that stored the Borders.com product listing. The storing user may have commented on the stored product listing, such as including notes regarding the price, the edition of the book, comments about the book itself, etc. Metadata such as this may be maintained by ECSS server 108 so that the user may review this in addition to any metadata contained with the electronic content itself (e.g., metadata included with the product listing from its original source). Furthermore, search results may indicate data about various elements of stored electronic content 208, such as which product listings were stored the most, which product listings were utilized for purchases the most, and the like. Additionally, ECSS server 108 may provide a user with other relevant electronic content, such as electronic ads and offers associated with the target product. ECSS server 108 may also be configured to display a directory of participating vendors, thereby allowing a user to determine which vendors have electronic content stored in database 210.

ECSS server 108 may enable the purchase of a product included in a stored product listing. ECSS server 108 may collect the necessary financial information and user information (e.g., name and address) or a user may have registered this information in his user account 206. ECSS server 108 may send this information to the appropriate item server 118 (e.g., a vendor server) to place the order for the product. The item server 118 may provide order confirmation in a traditional method, such as emailing it to the user, or it may relay this information to ECSS server 108 so that it may be stored in the appropriate user account 206. In one scenario, ECSS server 108 may enable a user to conduct multiple transactions at once. A user may select multiple products from various vendors for purchase and store them in an ECSS electronic shopping cart. When the user decides to conduct purchase the products in his ECSS cart, he may indicate so to ECSS server 108 and ECSS server 108 may provide the necessary information to each appropriate item server 118.

By its configuration, ECSS 100 may enable a user to comparison shop for a product conveniently. For example, a user may search ECSS server 108 for a television, receive stored product listings from multiple content publishers, and review the product listings, as well as associated content, such as user comments, electronic ads, and the like. If an electronic ad includes a promotion, such as a discount, the user may apply it to his transaction when purchasing the product via ECSS 100.

In one scenario, the ECSS server 108 may serve as a payment enabler itself. The user may provide payment to the ECSS service provider, which may in turn pay the participating vendor. This may be function on a per-transaction basis or the ECSS service provider may provide periodic lump sum payments for transactions conducted via ECSS 100. For example, the ECSS service provider may provide a weekly or monthly payment to a vendor for all relevant transactions that occurred during that time period.

As aforementioned, although the present invention has been described mainly in terms of Internet usage, this is not to be construed as limiting. For example, ECSS 100 may be employed via an interactive television system or mobile network. An ECSS icon may be displayed when a television program or ad is presented and the user may employ the "select" button on his television remote to store the electronic content to his user account 206. Alternatively, without an ECSS icon, another indicator or no indicator may be used. The user may later use the interactive television to access his user account 206 and view the content. Within a mobile network, the ECSS icon may be displayed graphically or as text and the user may select the icon or text for storage of the electronic content. Electronic content may have an audio indicator instead of or in addition to a visual icon. Voice commands may be used for interacting with the electronic content. For example, the user may speak "save content" into a microphone to have the electronic content stored to his user account 206.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the description should not be considered to be exclusive of these other embodiments. Also, it is to be understood that the phraseology and terminology employed herein are for the purposes of description and should not be regarded as limiting.

What is claimed is:

1. A method for an electronic content storage system to enable access to electronic content via a browser mechanism connected to an electronic network, the method comprising:
   receiving, from a browser mechanism, a request to access electronic content associated with a user account maintained at an electronic content storage server, the electronic content storage server maintaining a content identifier indicating a content publisher server maintained by a content publisher and the electronic content being stored at the content publisher server, the electronic content storage server having configured the electronic content to include an embedded computer code that enables the electronic content to be accessed and tracked via the electronic content storage server, whereby the electronic content includes a video, an image, or textual data that is associated with the user account for later retrieval;
   communicating the content identifier to the browser mechanism, thereby enabling the browsing mechanism to:
      access the content publisher server; and
      access the electronic content indicated by the content identifier;
   logging, at the electronic content storage server, electronic content tracking data associated with the electronic content indicated by the content identifier, wherein the electronic content tracking data includes: a quantity of times the electronic content is stored by separate user accounts at the electronic content storage server, a time and date the electronic content is associated with the user account, data regarding a user that associated the electronic content with the user account, a quantity of times the electronic content is shared between users of the electronic content storage server, and data regarding a user that shared the electronic content;

determining, at the electronic content storage server, electronic content usage data, wherein the electronic content usage data indicates the quantity of users that have viewed and the quantity of users that have not yet viewed the electronic content via the electronic content storage server; and communicating the electronic content tracking data and the electronic content usage data to the content publisher.

2. The method of claim 1, wherein the electronic content was associated with the user account by a user of the account.

3. The method of claim 1, wherein the electronic content was associated with the user account by a second user of the electronic content storage server.

4. A method for an electronic content storage system to enable access to electronic content via a browser mechanism connected to an electronic network, the method comprising:

receiving, from a browser mechanism, a request to access electronic content associated with a user account maintained at an electronic content storage server, the electronic content storage server maintaining a content identifier indicating a content publisher server maintained by a content publisher and the electronic content being stored at the content publisher server, the electronic content storage server having configured the electronic content to include an embedded computer code that enables the electronic content to be accessed and tracked via the electronic content storage server, whereby the electronic content includes a video, an image, or textual data that is associated with the user account for later retrieval;

retrieving from the content publisher server the electronic content indicated by the content identifier;

communicating the electronic content to the browser mechanism, thereby enabling the browser mechanism to access the electronic content;

logging, at the electronic content storage server, electronic content tracking data associated with the electronic content indicated by the content identifier, wherein the electronic content tracking data includes: a quantity of times the electronic content is stored by separate user accounts at the electronic content storage server, a time and date the electronic content is associated with the user account, data regarding a user that associated the electronic content with the user account, a quantity of times the electronic content is shared between users of the electronic content storage server, and data regarding a user that shared the electronic content;

determining, at the electronic content storage server, electronic content usage data, wherein the electronic content usage data indicates the quantity of users that have viewed and the quantity of users that have not yet viewed the electronic content via the electronic content storage server; and communicating the electronic content tracking data and the electronic content usage data to the content publisher.

5. The method of claim 4, wherein the electronic content was associated with the user account by a user of the account.

6. The method of claim 4, wherein the electronic content was associated with the user account by a second user of the electronic content storage server.

7. A method for an electronic content storage system to enable access to electronic content via a browser mechanism connected to an electronic network, the method comprising:

receiving, from a browser mechanism, a request to access electronic content associated with a user account maintained at an electronic content storage server, the electronic content storage server having previously obtained the electronic content from a content publisher server maintained by a content publisher and maintaining a content identifier indicating the electronic content, the electronic content storage server having configured the electronic content to include an embedded computer code that enables the electronic content to be accessed and tracked via the electronic content storage server, whereby the electronic content includes a video, an image, or textual data that is associated with the user account for later retrieval;

communicating the electronic content to the browser mechanism, thereby enabling the browser mechanism to access the electronic content;

logging, at the electronic content storage server, electronic content tracking data associated with the electronic content indicated by the content identifier, wherein the electronic content tracking data includes: a quantity of times the electronic content is stored by separate user accounts at the electronic content storage server, a time and date the electronic content is associated with the user account, data regarding a user that associated the electronic content with the user account, a quantity of times the electronic content is shared between users of the electronic content storage server, and data regarding a user that shared the electronic content;

determining, at the electronic content storage server, electronic content usage data, wherein the electronic content usage data indicates the quantity of users that have viewed and the quantity of users that have not yet viewed the electronic content via the electronic content storage server; and communicating the electronic content tracking data and the electronic content usage data to the content publisher.

8. The method of claim 7, wherein the electronic content was associated with the user account by a user of the account.

9. The method of claim 7, wherein the electronic content was associated with the user account by a second user of the electronic content storage server.

10. A method for an electronic content storage system to enable access to electronic content, the method comprising:

receiving, at an electronic content storage server, an instruction to associate electronic content with a user account, the electronic content distributed via a content publisher server maintained by a content publisher, the electronic storage server having configured the electronic content to include an embedded computer code that enables the electronic content to be accessed and tracked via the electronic content storage server, the instruction originating from the embedded computer code included in the electronic content;

associating, with the user account, a content identifier indicating the electronic content, wherein the content identifier is a database key for the electronic content as previously registered with the content storage system, whereby the electronic content includes a video, an image, or textual data that is associated with the user account for later retrieval;

receiving a request to access the electronic content indicated by the content identifier;

granting access to the electronic content indicated by content identifier, wherein the electronic content distributed via the content publisher server is storable by a user via the electronic content storage server by the instruction to the electronic content storage server to associate the electronic content with the user account and the electronic content is subsequently accessible by the user via the electronic content storage server;

logging, at the electronic content storage server, electronic content tracking data associated with the electronic content indicated by the content identifier, wherein the electronic content tracking data includes: a quantity of times the electronic content is stored by separate user accounts at the electronic content storage server, a time and date the electronic content is associated with the user account, data regarding a user that associated the electronic content with the user account, a quantity of times the electronic content is shared between users of the electronic content storage server, and data regarding a user that shared the electronic content;

determining, at the electronic content storage server, electronic content usage data, wherein the electronic content usage data indicates the quantity of users that have viewed and the quantity of users that have not yet viewed the electronic content via the electronic content storage server; and communicating the electronic content tracking data and the electronic content usage data to the content publisher.

11. The method of claim 10, wherein enabling access to the electronic content indicated by the content identifier comprises communicating the content identifier to a browser mechanism, thereby enabling the browser mechanism to:
  access the content publisher server; and
  access the electronic content indicated by the content identifier.

12. The method of claim 10, wherein enabling access to the electronic content indicated by the content identifier comprises the electronic content storage server:
  retrieving, from the content publisher server, the electronic content indicated by the content identifier; and
  communicating the electronic content indicated by the content identifier to a browser mechanism.

13. The method of claim 10, wherein enabling access to the electronic content indicated by the content identifier comprises the electronic content storage server:
  accessing, at the electronic content storage server, the electronic content indicated by the content identifier, the electronic content having been previously obtained by the electronic content storage server from the content publisher server; and
  communicating the electronic content indicated by the content identifier to a browser mechanism.

* * * * *